United States Patent [19]
Langley

[11] Patent Number: 5,869,193
[45] Date of Patent: Feb. 9, 1999

[54] BREATHABLE POLYVINYL ALCOHOL PROTECTION WEAR

[75] Inventor: John D. Langley, Guntersville, Ala.

[73] Assignee: Kappler Safety Group, Guntersville, Ala.

[21] Appl. No.: 340,703

[22] Filed: Nov. 16, 1994

[51] Int. Cl.⁶ .................................................. B32B 27/08
[52] U.S. Cl. .............................. 428/520; 2/457; 2/161.7; 2/167; 2/200.1; 428/913
[58] Field of Search ..................... 428/520, 913; 2/161.7, 167, 200.1, 457

[56] References Cited

U.S. PATENT DOCUMENTS

| | | | |
|---|---|---|---|
| 4,772,510 | 9/1988 | McClure | 428/286 |
| 5,059,477 | 10/1991 | Henriksen | 428/220 |
| 5,062,161 | 11/1991 | Sutton | 2/169 |
| 5,082,734 | 1/1992 | Vaughn | 428/411.1 |
| 5,275,861 | 1/1994 | Vaughn | 428/76 |

FOREIGN PATENT DOCUMENTS

| | | | |
|---|---|---|---|
| 2330316 | 1/1974 | France | . |

OTHER PUBLICATIONS

Abstract of Japanese Patent 60/0044897, Mar. 11, 1985.

Abstract of Chinese Patent 1,042,733, Jun. 6, 1990.

*Primary Examiner*—Christopher Raimund
*Attorney, Agent, or Firm*—Henry Croskell, Esq.

[57] ABSTRACT

The present invention provides a readily disposable hazardous chemical and medical waste protection wear suitable for human use through utilization of a breathable, stand alone or combination laminant utilizing polyvinyl alcohol sheet material which is water soluble at various temperatures providing disposal of the stand alone or outer coating of a laminate material if utilized with reusable protection wear. The polyvinyl alcohol stand alone provides the wearer with comfort through having a MVTR rate of at least 450 grams/meter squared per 24 hours. In addition, a combination of polyvinyl alcohol and polyvinylidene chloride provides a readily disposable splash suit which is most suitable for a variety of chemicals while yet being readily disposable ie. the PVA being readily soluble in warm water and the PVDC being dispensable in water and being biodegradable.

13 Claims, No Drawings

BREATHABLE POLYVINYL ALCOHOL PROTECTION WEAR

FIELD OF THE INVENTION

The present invention relates to breathable polyvinyl alcohol sheet materials suitable for use as protective wear for protection against the influence of chemicals. In another aspect the present invention relates to a readily disposable, breathable polyvinyl alcohol protection wear which is suitable for disposable clean room use. In yet another aspect the invention relates to a hot water disposable hazardous chemical and medical waste protection wear. In still another aspect the invention relates to field applications to existing protection wear of readily washable barrier coatings of polyvinyl alcohol, removable by an onsight water washing.

BACKGROUND OF THE INVENTION

It is well known to utilize various composite fabrics which are in part or totally disposable after use. Garments, linens, drapes, towels and other useful articles provided as a composite for medical use and chemical use are available. Regarding hospital and medical use, disposables and reusable fabrics and composites are used to face the considerable quantities of infectious material medical waste in primary and acute care facilities. One of the principle reasons why medical and other facilities have turned to disposables is that reusables suffer from one physical property or another, specifically reusables cannot readily provide liquid barrier properties especially after the initial two or three laundry cycles.

Although there is clearly a benefit in the use of disposables in the medical arts by avoiding the necessity of human contact with medical waste in cleaning reusables, nonbiodegradable disposals are posing a problem which is only now being recognized. Landfill sites are becoming increasingly burdened with disposables which do not biodegrade for decades. As landfill sites become fully exploited, new sites must be found which are rightfully opposed by residents located proximate to the proposed site locations. In addition, incineration fails to be a viable alternative. Waste disposal incinerators are wholly inadequate. In addition these same disposable problems exist and possibly even more serious regarding hazardous chemical suits and wear.

One of the requirements for obtaining safe working conditions for employees in various industries other than medical or emergency service organizations is the provision of protective garments that prevent toxic chemicals or other contaminants from coming into contact with the worker's body. The need for such protection has been emphasized in recent years by enactment of local, state and federal laws and/or regulations requiring the use of protective garments under many circumstances.

Various types of materials have been used for chemical barrier applications including polymeric films, rubber-based sheet material and multilayered composites made by bonding of film layers to one another or to fabric. While the available materials may provide an effective barrier to some types of chemicals, none are known to prevent permeation of all hazardous chemicals. One polymeric film material, for example, is effective for primary alcohols and inorganics mineral acids, but not for saturated hydrocarbons and chlorinated olefins. Another material is effective for many types of chemicals, but not for organic solvent compounds or heterocyclic ethers. Such gaps in coverage require careful selection of the protective material for its end use environment. In many instances, the specific chemical components in a contaminating mixture, as may be present in waste cites and hazardous response situations, may be unknown so that selection of particular contaminants is not feasible. A need thus exists for a barrier material effective for a wide range of chemicals even beyond those currently being utilized.

The migration of chemicals through a complex laminated material involves a sequence of process steps including adsorption, diffusion and desorption, the combination of which is defined as permeation. There are a number of factors which influence the rates that each of these process steps will occur, or whether each step will occur at all. The various factors which govern the permeation rates include degradation of the laminate by the chemical, temperature, pressure, thickness, solubility, stereo chemistry, concentration, state, vapor pressure, viscosity and the like. If the chemical from which protection is sought is a liquid the rate limiting step becomes diffusion in the adsorption and desorption effects can be neglected. Diffusion under ideal circumstances is governed by the solubility of the chemical and the protective material relative to each other.

A continuing need for protective garments with low permeability, i.e. long break through time and a low permeation rate, for various chemical compounds or mixtures of compounds. The polymer membranes and laminates used in protective wear such as gloves, coverall suits, hoods, boots and the like, for use in a work environment or in a home or in an emergency spill environment must protect against chemical compounds or mixtures thereof which are hazardous to health. Such compounds can include organic solvents, paints, varnishes, glues, cleaning agents, degreasing agents, drilling fluids, epoxy materials, and the like. Permeation studies have surprisingly shown that the break through time is often less than half an hour, sometimes only a few minutes or less. The studies have also shown the break through time and a permeation rate is to a great extent depended upon the combination of the hazardous substance and the material for protective clothing. In view of the foregoing, it is quite obvious that a great need exists for protective garments featuring polymer membranes without the aforementioned disadvantages. Unfortunately, no method of selecting suitable combinations other than the method of trial and error has been proposed; however, certain stand alone film membranes or sheet materials have chemically been diagnosed as having resistance to specific chemicals. One of these membranes or sheet materials can be constructed of polyvinyl alcohols and various copolymers of polyvinyl alcohols. In addition, polyvinyl alcohol polymer sheet materials can be readily soluble in water. This solubility in water can be adjusted by additives to the polyvinyl alcohol and various other treatments which can elevate the water temperature of solubility of the polyvinyl alcohol to temperatures higher than normal use, i.e. 130°–150° F. and above. A totally water soluble polymer sheet material could be most useful in meeting disposable requirements of state, federal and local governments and such materials can be readily applied to an existing chemical protection suit and desorbed from the surface of the suit in the field after use by hot water washing.

SUMMARY OF THE INVENTION

The present invention relates to improved protective wear for protection against chemicals, clean room applications, protection against contaminant particle applications; additive protection through ease of application and disposal of protective coatings of selected polymeric membranes as well as a method for applying and readily disposing of such stand alone or additional protective coatings utilized either in the hazardous chemical or hazardous medical environments.

Commonly used sheet materials such as polyolefins, various rubbers, neoprene, silicon rubbers and the like have insufficient barrier properties with respect to certain chemicals, for example epoxy materials, organic solvents and the like in that they have relatively short break through times. Three dimensional solubility parameter system as described by C. M. Hansen may be suitable as a guide for the realtion selection of suitable barrier membrane materials for protection garments.

The three solubility parameters terms $\delta_H$, $\delta_P$ and $\delta_D$, measured in $(cal/cm^3)^{1/2}$, quantify the molecular cohesive forces (the hydrogen bonding, polar and dispersion forces) in a given compound or mixture of compounds. The so far commonly used membrane materials for protective garments have $\delta_H$- and $\delta_P$-values of about 3 or less, and $\delta_D$-values of about 9. In view of the low $\delta_H$- and $\delta_P$-values, these membrane materials are designated as low-energy type polymers because of the relatively low level of interr\molecular cohesive forces. The solubility parameter values are fairly close to the solubility parameter values occupied by a major part of the commonly used solvents and epoxy materials.

The chemical barrier properties and water solubility of polyvinyl alcohol PVA, also as known as PVOH, are known. Polyvinyl alcohol offers a good resistance to organic solvents. For example against chlorinated hydrocarbons, aeromatics or similar compounds and is one of the few materials that does not swell in trichlorethylene and tetrachlorothane which are used in degreasing agents. However, the biggest disadvantage of such polyvinyl alcohol barrier layers has proven to be water solubility, which can only be slightly alleviated by adding aldehydes and other compounds. In the present invention, this water solubility is considered an advantage which is utilized in a unique way for providing both additional protection for existing fabrics provided by polyvinyl alcohol but also methodology for applying and washing away contaminated polyvinyl alcohol exterior films after use. Such washing in warm or hot water removes the polyvinyl alcohol from its base fabric or protective suite and is quite acceptable for sewer disposal. In some applications even cold water washing at temperatures slightly above freezing is desirable.

The invention also presents a breathable, readily disposable hazardous chemical protection wear suitable for human use which is a stand alone hazardous chemical protection suit of at least one PVA sheet material layer, the PVA sheet material being soluble in water at a water temperature of about 130° F. to about 140° F. or greater. The suit providing the user protection against specific chemicals which readily penetrate commonly used commercially available chemical protection wear. Those compounds including organic solvents and the like. The stand alone PVA suit which can include impulse seaming for chemical protection in accordance with the present invention are easily disposable by hot water washing. The stand alone PVA suit provides the wearer comfort with a MVTR rate of at least about 450 grams per meter squared per 24 hours. Such a MVTR rate is quite suitable for wearer comfort in utilizing the PVA stand alone or PVA in combination with other laminated coating layers such as polyvinylidene chloride (PVDC) which is a water impermeable coating layer. A combination of PVA and PVDC, either as a stand alone fabric for protective suits or as a coating for chemical protective suits, provides both additional organic solvent and the like barrier for the suit but also gives splash protection against water, alcohols and the like for the immediate laminated coating. In addition, the stand alone combination of PVA and PVDC provides a readily disposable splash suit which is most suitable for a variety of chemicals while yet being readily disposable, i.e. the PVA being readily soluble in warm water or hot water and the PVDC being dispersible in water. Both compounds forming the laminate being readily suitable for sewer release since PVA dissolves in water and the PVDC is biodegradable.

The stand alone PVA and/or PVA plus PVDC laminate protective suit can be utilized in clean room applications by the worker and in reverse, can be utilized to protect worker from hazardous particulate matter inclusive of radioactive particles. Disposal of the suits and hazardous particulate materials can be achieved through the use of hot water and separation techniques for capturing the particulate materials.

In another application these materials can be adjusted by addition of copolymers, polymer blends, complexing compound and the like in order to adjust the materials response to pH as well as water wash temperatures. For example, the polyvinylalcohol sheet material is soluble in warm or hot water under pH ranges of at least 7.5 or less than about 6.5. Such pH—hot water solubility condition avoids wearer body fluid breakthrough into the environment in clean room use or degredation of the wear by sweat.

DETAILED DESCRIPTION OF THE INVENTION

A solubility parameter system is primarily used for formulating paint coatings, i.e. for selecting solvents for particular binders. The principle is that a solvent is selected, the solubility parameter of which is as close as possible to the solubility parameter of the binder. Often, a solvent is selected which is constituted by a mixture of components, in which case the relevant solubility parameter set is the solubility parameter set of the mixture, which is calculated from the parameter set of the individual components by calculating each parameter in the set as the volume weighted average. These solubility parameter sets can be utilized for predicting a completely different combination of relative properties between two materials, that is the break through time and the permeation rate of a fluid in a polymer membrane. The greater the distance is between the solubility parameter set of the fluid and the polymer, the longer the break through time and the lower the permeation rate.

Materials which comply with these conditions are the so-called high energy polymer materials, polymer materials with high molecular cohesive forces and particular high hydrogen-bonding and polymer cohesive forces while most known polymer membrane materials including polymer membrane materials conventionally used for protective garments, are low-energy polymer materials.

A synthetic polymer high energy material is one which is substantially water insoluble. However, an example of a high energy material which is soluble in water is polyvinyl alcohol. Although polyvinyl alcohol shows a high break through time and a low permeation rate for the epoxy materials organic solvents, polyvinyl alcohol has not been widely used as a protective barrier. The water soluble character of PVA results in a number of disadvantages which are believed to exclude the materials utility as a protective garment membrane for practical purposes. The water solubility of PVA renders the polymer subject to dissolution in contact with external aqueous media or in contact with sweat. Furthermore, even small amounts of water or moisture which will not directly dissolve a PVA membrane, will tend to swell and plasticize the membrane to such an extent that the membrane loses permeation resistance properties it would otherwise possess. Moreover, in the practical processing of PVA membrane sheet material and the like where large amounts of plasticizer must be used will tend to increase the mobility of the PVA molecules and hence to increase the permeability.

Such known disadvantages identified with the use of PVA membranes, films and other sheet materials, is in accordance with the present invention an advantage because of the specific use of the PVA materials in order to achieve readily disposable MVTR breathable rates which allow comfort to the user in stand alone disposables which are readily exposed in warm water. Moisture Vapor Transmission Rate (MVTR) is determined by the directives of ASTM Designation: E96-80 entitled "Standard Test Methods for WATER VAPOR TRANSMISSION of Materials" herein incorporated by reference.

In the PVA/PVDC laminated stand alone sheet material according to the invention, the PVA is readily disposable in hot water while the PVDC is dispersable in hot water and yet each component provides the user with specific protection from splash and other contaminant contact with organic solvents and the like while the PVDC outer film can assist in protecting the PVA film from water splash disintegration. In addition, the stand alone laminate or stand alone PVA sheet material for protection wear, provides sufficient physical strength in order to achieve a disposable, breathable wear suitable for many applications including selected hazardous chemicals, hazardous medical use exposure and hazardous contaminant particle exposure. In addition, the stand alone wear can be utilized for clean room applications protecting the environment from user contamination as well as protecting the user from environment splash of chemicals while yet allowing comfort to the user or wearer through relatively satisfactory levels of MVTR.

Polyvinyl alcohols are generally made by hydrolysis from polyvinyl acetate and the degree of hydrolysis affects solubility and other properties. Fully hydrolysed polyvinyl alcohols (e.g., hydrolysed to an extent of at least about 98%) tend to be readily soluble only in warm or hot water. These PVA films are preferred for use in the invention but polyvinyl alcohol which are not quite so fully hydrolysed, could be used in certain applications, as the less hydrolysed grades tend to dissolve more readily in ambient water, e.g., from about 85° F. to 100° F. or lower. Partially hydrolysed polyvinyl alcohol can be used, having a degree of hydrolysis from polyvinyl acetate of 70 to 95%.

The water dissolvable film generally has a thickness of at least 5 $\mu$m and usually 20 $\mu$m or greater, with a thickness of around 40 $\mu$m often being preferred. These thicknesses are suitable especially for polyvinyl alcohol.

A co-extruded layer of impermeable material can be of any sunthetic polymer that will provide an adequate vapour and gas barrier (despite its thinness) when wet. It can be, for instance, of a copolymer of ethylene and vinyl alcohol but is preferably of a polymer of vinylidene chloride (PVDC). This can be a vinylidene chloride hompolymer or a copolymer with vinyl chloride or methyl acrylate.

The coextruded, melt-bondable, layer can be of any polymeric materials that can be coextruded with the impermeable material at the desired thickness and that will provide a layer that can be melt-bonded to secure the laminate to itself or to another surface and that will impart the desired strength and other properties to the coextruded film. In other applications, the PVDC film can be formed on the PVA by solvent deposition, pressure contact of preformed films and the like.

Another film can be formed of an ethylene copolymer. It can be an ehtylene-alkyl acrylate copolymer, an ethylene vinyl acetate (EVA) copolymer. The EVA will normally have a vinyl acetate content of from 5 to 25%. The layer of EVA or other ehtylene polymer has a melt flow index (MFI) of from 0.5 to 7 (expressed as g/10 min and measured at 190° C. according to ASTM-D-1238). The presence of the coextruded layer of EVA or other melt bondable copolymer reduces or eliminates the risk of pinhole porosity that might otherwise exist due to the very low thickness of other impermeable layers and permits effective melt bonding of the laminate. One result of using a co-extruded film of the two materials, instead of two separate films, the difficulties or producing and handling impermeable, undamaged, very thin films are avoided.

The melt-bondable layer must be exposed and must be on the side of the impermeable layer distant from the water disintegratable layer, in order that it can permit melt bonding. There may be a plurality of melt-bondable layers but generally there is a single melt-bondable layer. Additional, non-interfering, thin layers may be coextruded between the melt-bondable layer and the layer of impermeable material but generally the melt-bondable layer is coextruded in direct contact with the surface of the layer of impermeable material.

A co-extruded film may include layers additional to the layers of impermeable material and of ethylene copolymer. In particular the co-extruded film may include an inner EVA or other ethylene copolymer layer or another inner layer that promotes bonding of the PVDC or other impermeable layer to the water soluble film. Total thickness of the co-extruded film is less than 20 $\mu$m, generally 10 to 20 $\mu$m, and the thickness of the impermeable layer in the co-extruded film is from 5 to 11 $\mu$m. The thickness of each melt-bondable layer is generally from 3 to 10 $\mu$m.

The co-extruded film can be adhered to the water disintegratable film in any convenient manner. The two films may be formed separately and then laminated by use of any suitable laminating adhesive. Suitable adhesives for the lamination of films are well known and include polyurethane adhesives, especially two-component adhesives, such as the product sold by Morton Thiocol under the trade name Adcote 710 A & C. The amount of laminating adhesive is usually in the range about 1 to about 15 g/m, preferably around 5 g/m$^2$.

Instead of using preformed films, the water disintegratable film can be coextruded with the layer of impermeable material and the melt-bondable layer, generally with an adhesion-providing (or tie) layer between the water disintegratable and impermeable layers. Materials that can be used as tie layers are known and include, for instance, modified PVDC polymers.

The laminate may include additional layers either between the disintegratable film and the layer of impermeable materials or, more usually, on the side of the disintegratable film distant from the impermeable layer, provided any such additional layer does not adversely affect the properties of the laminate. For instance any such layer may be a water-disintegratable film or biodegradable film. Suitable biodegradable, water insoluble films are often hydrophilic and may be cellulosic material. The layered materials may be bonded over the entire surface area to the water disintegratable film, either by coextrusion or by use of an adhesive layer or both, but it is often preferred that it is spot bonded. The provision of a water-insoluble biodegradable layer over the exposed surface of the water soluble layer is advantageous in that it protects the water soluble layer from moisture and yet the article can still easily disintegrate in water. The use of spot bonding and/or an adhesive that disintegrates in water is advantageous.

It can also be desirable to apply, on the outer side of the water soluble film, a water-degradable non-woven fabric. This is generally bonded to the laminate after the laminate has been manufactured to its final dimensions. The non-woven fabric can be melt-bonded, for instance as a reuslt of a provision of an appropriate melt-bonding layer between the fabric and the water-disintegratable or other adjacent layer or it can be laminated using an appropriate liquid adhesive. The fibers in the fabric are preferably cellulosic and can be bonded, preferably by water soluble or dispersible bonding agent.

The laminates of the invention can be made by conventional eoextrusion and lamination techniques and, as is well known, these can involve stretching extruded films down to the desired thickness. When the laminate is made by bonding a coextruded film with preformed films or other layers, the films will normally have been stretched prior to lamination.

The inventor's goal is therefore to create a protective garment of the kind described earlier, which does not have the disadvantages mentioned above. The PVA-PVDC protective garment should be water splash resistant, as well as resistant to organic solvents, and most importantly it should be flexible up to the level required by for example gloves. To achieve this goal leads to the thought that at least one of the material layers should be made water resistant and covered with a second material layer, which should protect against organic solvents, especially against chlorinated hydrocarbons, aromatics, or similar, and which does not swell when used with degreasing agents. As a further advantage this material layer should consist of polyvinylalcohol, possibly mixed with aldehydes, e.g. formaldehyde, however any substance with the same properties could be used in its place.

The PVA material layer can be made water-tight and flexible by using a rubber-like substance. Whether priority will be given to natural rubber or synthetic rubber depends extensively on the end-use of the protective garment, and the respective production method. As a special advantage one must look at the possibility of being able to manufacture a part of a protective glove for example, namely the water resistant material layer, by using the common processes already used in the manufacture of rubber gloves.

To create durable connection between the rubber layer and the applied PVA film, for example through spraying, dipping or other processes, each rubber layer has a rough surface on the outside, which can take on the PVA or PVA/PVDC and keeps it in place. Rubber has proven itself especially favorable, the thickness of which corresponds to the thickness of the material layer, which serves as the coating and is resitant against solvents, but about a ratio of 10:1 to 5:1, for example a rubber film with a thickness of 0.1 mm to 1.5 mm requires a coating which is 0.01 mm to 0.3 mm thick.

Since PVA in its natural state possesses virtually none of the elasticity or flexibility normally found in rubber, the above described protective gloves with textile frame are always very stiff, and therefore of no use for precision work. The glove in question made of a rubber layer with a PVA film eliminates this shortcoming; it is very flexible and can even become more supple by adding softener to the polyvinylalcohol.

Another feature of the invention is that one version of the glove, in spite of the elasticity of the material, can be put up\stood up in a stiff form (e.g. on a table) without support before the application of the covering layers; the shaped water-resistant material layer can be stood up without additional support, with the arm side edge to the bottom; this condition simplifies the preparation work before the application of the PVA films.

The thickness of the polyvinylalcohol coating or stand alone breathable protection wear can vary from about 3 to up to 75 microns in thickness depending on application. Moreover, polyvinylalcohol may be plasticised to a desired degree if flexibility and hygroscopicity, for example by the use of a mixture of polyethylene glycol and polyester polyol in an amount of from about 5 to 25% by weight of the PVA or glycerol in an amount of from 10 to 20%, preferably 12 to 15% by weight, and formulated to have a desired degree of solubility. A hot water soluble grade will remain coherent for longer than a cold water soluble grade if particularly wetted accidentally, but still be broken up in a hot water wash or spraying and completely dissolved into a drain system.

For certain applications regenerated cellulose film is suitable as it is relatively cheap and strong and may be plasticised to various degrees of elongation and flexibility; moreover is commercially availble with an anchored waterproof coating on one surface which forms a good substrate for a coated water-impermeable layer.

Such film when wetted on the uncoated surface becomes limp and is bio-degradable. Suitable materials for forming a water-impermeable coating layer are polyvinylidene chloride (PVDC), vinyl chloride-vinylidene chloride copolymer (Saran—Registered Trademark), atactic polypropylene, nitro-cellulose, waxes, greased, silicones, pressure-sensitive adhesives, for example a solution of a rubber latex in an organic solvent. However the choice of materials is wide and moreover the water-impermeable layer may be formed, not by coating the backing layer, but by a film which is adhered to the backing layer.

Examples of suitable coating thicknesses are 3 to 10 $g/m^2$ for Saran, PVDC and plasticised nitro-cellulos coating, 5 to 6 $g/m^2$ for a latex coating and 5 to 30 $g/m^2$ for a cold-sealing adhesive invention.

Impulse sealing can be utilized with the PVA materials for forming wear protection articles such as suits, gloves and the like. Seams can also be formed by heat sealing in conjunction with the use of adhesives. If the seams are made by heat sealant together adjacent water impermeable coating layers, the strength of the article is limited by the strength of adhesion between the coated layer, for example of PVDC and the backing layer PVA. However the degree of adhesion obtainable between materials which are otherwise very useful for forming the backing and the water-impermeable layers is often very low, even when there are employed such techniques for improving anchorage of a pre-coat of a curable resin of, for example, the urea-formaldehyde type or a casein latex emulsion pre-coat for a rubber latex coating. It is possible to pre-coat PVA films, even though water-soluble, with aqueous emulsions such as an acrylic-based emulsion for applying a tacky or adhesive coatings. Although by the use of a PVDC coating on a PVA backing layer, a perfectly acceptable seal strength for most applications has been constructed by a coating to coating seal.

The present invention provides stand alone PVA layer with for example impulse seaming for chemical protection in combination with readily disposable techniques utilizing hot water. PVA wear protection that is coated with a latex PVDC dispersion for added resistance against alcohols and splash resistance to water is also achieved. Both the PVA and PVDC dispersion will dissolve or disperse in water and is suitable for sure disposal. Biodegradable wear protective suit fabric can utilize as a backing or strength material cellulose-based fabric with PVA and/or PVA plus PVDC. In addition, split PVA film in narrow widths can be woven into a woven fabric and the fabric coated with a PVA barrier. All of these PVA and PVA plus PVDC combination protection wear materials possess desirable MVTR rates of about 450 and above.

In another aspect the invention utilizes a PVA spray dispersion or dip on existing chemical protection suits to enhance chemical resistivity and provide a means for effective decontamination. The effective decontamination is acheivable by, for example, in the field application of PVA to protection wear by spray or dip procedures and immediate warm or hot water wash-off. PVA dispersion as a dip in combination with elastomer polymers (neoprene, viton, butyl and the like) is possible in order to achieve immediate field additional protection and decontamination. The PVA can be utilized as layers buried between elastomer dips for protection against alcohols and water while greatly enhancing the overall chemical resistance of the wear fabric. In certain applications, PVA coated fabric has the additional advantage for use in static sensitive environment. PVA naturally is anti-static due to it hydrophilic nature.

The Moisture Vapor Transmission Rate (MVTR) determined by the ASTM E96-80 entitled "Standard Test Methods for WATER VAPOR TRANSMISSION of Materials" of several sheet material in Table 1. Sample 1 is a control, i.e. open cell with no sheet material, open evaporation without interference. Sample 2, 3 and 6 are commercial sheet materials used in medical wear. Samples 4 and 5 are sheet materials in accordance with the present invention. PVA and PVA-PVDC indicate the highest MVTR readings of the materials tested, most comfortable for the user.

TABLE 1

| Sample | Begin Wt. | − | End Wt. | = | Wt Loss | MVTR $(g/m^2$ 24 hr) | % Open Cell |
|---|---|---|---|---|---|---|---|
| 1 OpenCell | 206.041 | − | 194.886 | = | 11.155 | 1466 | — |
| 2 Proshield 2 | 200.380 | − | 193.740 | = | 6.640 | 873 | 60% |
| 3 KC-Europe | 250.536 | − | 247.111 | = | 3.425 | 594 | 41% |
| 4 PVA-PVDC | 268.051 | − | 262.907 | = | 5.144 | 892 | 61% |
| 5 PVA-film | 248.062 | − | 241.714 | = | 6.348 | 1100 | 75% |
| 6 Tyvek | 204.138 | − | 198.213 | = | 5.925 | 779 | 53% |

| Conditions: | | | |
|---|---|---|---|
| Temp | | | Humidity |
| 80° | 7/14 | 9:05 am | 70% |
| 80° | 7/14 | 4:00 pm | 65% |
| 80° | 7/15 | 8:00 am | 60% |
| 80° | 7/15 | 9:00 am | 60% |

Existing commercially available chemical resistant suits which can be prepared for enhanced protection by coating by PVA and/or PVA-PVDC are presented in Table 2. These wear items gloves, head gear and the like can be dipped in the PVA or PVA-PVDC materials or sprayed with the coating on the scene in emerging conditions and removed by warm or hot water washing, also at the scene. For example, plants, laboratories or road side spills can meet with greater wearer protection by simple addition of these coatings.

TABLE 2

| | FABRICS | | | | | | | | |
|---|---|---|---|---|---|---|---|---|---|
| | V/N/C | | | BUTYL | | | NEOPRENE | | |
| | Average Break-Through Time (Min.)[1] | Average Perm. Rate[2] $\mu g/cm2/min$ | SDL[3] (PPM) | Average Break-Through Time (Min.)[1] | Average Perm. Rate[2] $\mu g/cm2/min$ | SDL[3] (PPM) | Average Break-Through Time (Min.)[1] | Average Perm. Rate[2] $\mu g/cm2/min$ | SDL[3] (PPM) |
| ASTM F1001 LIQUIDS | | | | | | | | | |
| Acetone | 90 | 1 | .05 | 125 | .037 | .05 | 18 | 33.7 | .056 |
| Acetonitrile | 120 | 1 | .12 | 120 | .022 | .078 | 42 | 9 | .11 |
| Carbon Disulfide | >480 | 0 | 2.0 | 2 | 380 | 1.0 | 4 | 380 | .83 |
| Dichloromethane | 16 | 101 | .11 | 3 | 583.3 | .09 | 6 | 1633.2 | .038 |
| Diethylamine | 13 | 143 | .71 | 3 | 526.7 | 1 | 16 | 566.7 | 1 |
| Dimethylformamide | >480 | 0 | 1.0 | >480 | 0 | 1 | 60 | 106.7 | 1 |
| Ethyl Acetate | 49 | 16 | .026 | 28 | 19 | .056 | 17 | 213.3 | .078 |
| n-Hexane | >480 | 0 | .092 | 4 | 486.7 | .11 | 19 | 79.7 | .014 |
| Methanol | 392 | 1 | .23 | 303 | .037 | .16 | 210 | 3 | .2 |
| Nitrobenzene | >480 | 0 | 1.0 | >480 | 0 | 1 | 45 | 49.3 | 1 |
| Sodium Hydroxide | >480 | 0 | .13 | >480 | 0 | .13 | >480 | 0 | .13 |
| Sulfuric Acid | >480 | 0 | .019 | *452 | .178 | .019 | >480 | 0 | .019 |
| Tetrachloroethylene | >480 | 0 | .051 | 1 | 10.3 | .062 | 17 | 966.7 | .065 |
| Tetrahydrofuran | 22 | 103 | .41 | 9 | 333.3 | .039 | 10 | 536.7 | .029 |
| Toluene | *451 | 0 | .023 | 6 | 770 | .2 | 11 | 920 | .13 |
| ASTM F1001 GASES | | | | | | | | | |
| Ammonia | NT[5] | NA[6] | NT[5] | NT[5] | NA[6] | NA[6] | NT[5] | NA[6] | NA[6] |
| 1,3-Butadiene | NT | NA | NA | NT | NA | NA | NT | NA | NA |
| Chlorine | NT | NA | NA | NT | NA | NA | NT | NA | NA |
| Ethylene Oxide | NT | NA | NA | NT | NA | NA | NT | NA | NA |
| Hydrogen Chloride | NT | NA | NA | NT | NA | NA | NT | NA | NA |
| Methyl Chloride | NT | NA | NA | NT | NA | NA | NT | NA | NA |

TABLE 2-continued

FABRICS

| | V/N/C | | | BUTYL | | | NEOPRENE | | |
|---|---|---|---|---|---|---|---|---|---|
| | Average Break-Through Time (Min.)[1] | Average Perm. Rate[2] µg/cm2/min | SDL[3] (PPM) | Average Break-Through Time (Min.)[1] | Average Perm. Rate[2] µg/cm2/min | SDL[3] (PPM) | Average Break-Through Time (Min.)[1] | Average Perm. Rate[2] µg/cm2/min | SDL[3] (PPM) |

*At least one of three cells showed no breakthrough **USCG DATA
[1]Average Breakthrough Time (minutes)-Average time between contact of chemical on outside of material surface and detection of chemical on inside surface.
[2]Average Permeation Rate (micrograms per square centimeter per minute)-Average rate at which a chemical permeates the material after breakthrough has occurred and steady-state conditions have been reached.
[3]SDL-System Detection Limit (parts per million)-A measure of the sensitivity of the permeation test method and equipment. It is recommended that the SDL value be no greater than 1.0 ppm.
[4]ND-None Detected-No breakthrough detected in the test period.
[5]NT-Not Tested.
[6]NA-Not Applicable.
NOTE:
These permeation tests were performed in accordance with ASTM F739 standards by Radian Corporation. This data is derived from tests performed on material samples only, not finished garments.
WARNING: There are uses, environments and chemicals for which these garments are unsuitable. It is the responsibility of the user to review available data and verify that the garment is appropriate for the intended use and meets all specified health standards.
CAUTION: Do not use for fire protection. Avoid open flame or intense heat.

PVC Totally Encapsulting Suit

The Life-Guard PVC suit provides exceptional protection in most acid and caustic applications. The suit's seams and PVC zipper are heat sealed for maximum protection and durability. Key features include large PVC view window, adjustable internal belt, tapered shape to avoid ballooning, and ample room in sleeves.

Butyl Totally Encapsulating Suit

Life-Guard's Butyl suit is a good workhorse garment, and is excellent for many chemical applications. Designed for many uses, the suit is comfortable too. The adjustable internal waise belt insures all of the suit's weight is carried on the hips and the large view window provides maximum vision.

Viton®/Nomex®/Chlorobutyl Totally Encapsulating Suit

Life-Guard's Viton/Nomex/Chlorobutyl Totally Encapsulating Suit is exceptionally durable and offers excellent protection from many chemicals. As with all Life-Guard Level A suits, our Viton garment has the unique construction that eliminates the need for a head gear assembly.

Neoprene Chemical Protective Clothing

Life-Guard's Neoprene garments offer excellent protection from many chemical hazards. All of the seams are sewn and then strapped with pure Neoprene, and the closures are fastened by sturdy reinforced snaps.

What is claimed is:

1. A readily disposable hazardous chemical and medical waste protection wear suitable for human use, comprising:
   a breathable, stand-alone hazardous chemical and medical waste protection suit of at least one polyvinyl alcohol sheet material, the polyvinyl alcohol sheet material being soluble in water at a temperature of about 130 degrees fahrenheit or greater, at least one polyvinyl alcohol sheet material being coated with at least one polyvinylidene chloride sheet material, the polyvinylidene chloride being dispersible in water at the temperature of solubility for the polyvinyl alcohol, the wear providing the user protection against organic solvents, organic compounds, medical waste and body fluids which generally attack many water impermeable fabrics; and
   the wear having a MVTR rate of at least 450 grams/meter squared per 24 hours.

2. The protection wear according to claim 1 wherein the protection wear comprises three dimensional gloves.

3. The protection wear according to claim 1 wherein the protection wear comprises head covers inclusive of face covers.

4. The protection wear according to claim 1 wherein the wear provides foot wear covers.

5. The protection wear according to claim 1 wherein the wear is in the form of human wear garments for both upper and lower torso.

6. The protection wear according to claim 1 wherein the breathable wear provides antistatic environmental protection.

7. The protection wear according to claim 1 wherein the wear protects the wearer from hazard particulate materials.

8. The protection wear according to claim 7 wherein the hazard particulate materials are radioactive.

9. A readily disposable hazardous chemical and medical waste protection wear suitable for human use and indissoluble in the presence of human perspiration, comprising:
   a breathable, stand-alone hazardous chemical and medical waste protection suit of at least one polyvinyl alcohol sheet material, the polyvinyl alcohol sheet material being soluble in water at a temperature of about 130 degrees fahrenheit or greater and a pH of at least 7.5 or less than about 6.5, the at least one polyvinyl alcohol sheet material being coated with at least one polyvinylidene chloride sheet material; the polyvinylidene chloride being dispersible in water at the temperature of solubility for the polyvinyl alcohol material, the wear providing the user protection against organic solvents, organic compounds, medical waste and body fluids; and
   the suit having a MVTR rate of at least 450 grams/meter squared per 24 hours.

10. The readily disposable clean room wear according to claim 9 wherein the wear is suitable for air purge cleaning.

11. The readily disposable clean room wear according to claim 9 wherein the wear is constructed from sheet material connected by impluse sealing.

12. The protection wear according to claim 9 which is suitable for splash protection from medical waste, body fluids, water, alcohols, organic solvents, and organic compounds.

13. A readily disposable clean room wear suitable for human use and protected clean room environment from the wearer, comprising:

a breathable, stand-alone hazardous chemical protection wear of at least one polyvinyl alcohol sheet material, the polyvinyl alcohol sheet material being soluble in water at temperatures of above about 130 degrees fahrenheit, at least one polyvinyl alcohol sheet material being coated with at least one polyvinylidene chloride sheet material, the polyvinylidene chloride being dispersible in water at the temperature of solubility of the polyvinyl alcohol, the wear providing the user protection against organic solvents and organic compounds which generally attack many water impermeable fabrics;

the wear having a MVTR rate of at least about 450 grams/meter squared per 24 hours; and the wear providing a clean room environment protection from body fluids and contaminated particles carried and/or expelled by one wearing the wear; the breathable wear providing anti-static clean room environmental protection.

\* \* \* \* \*